(12) United States Patent
Rossi

(10) Patent No.: US 8,978,020 B2
(45) Date of Patent: Mar. 10, 2015

(54) GENERATING REUSABLE TEST COMPONENTS OUT OF REMOTE APPLICATION PROGRAMMING INTERFACE

(75) Inventor: Claude Rossi, Valbonne (FR)

(73) Assignee: SAP SE, Walldorf, DE (US)

( * ) Notice: Subject to any disclaimer, the term of this patent is extended or adjusted under 35 U.S.C. 154(b) by 450 days.

(21) Appl. No.: 12/901,155

(22) Filed: Oct. 8, 2010

(65) Prior Publication Data

US 2011/0283148 A1 Nov. 17, 2011

(30) Foreign Application Priority Data

May 14, 2010 (EP) .................................... 10290256

(51) Int. Cl.
*G06F 9/44* (2006.01)
*G06F 11/36* (2006.01)

(52) U.S. Cl.
CPC .................................. *G06F 11/3684* (2013.01)
USPC ............................ 717/131; 717/132; 717/133

(58) Field of Classification Search
None
See application file for complete search history.

(56) References Cited

U.S. PATENT DOCUMENTS

| | | | | |
|---|---|---|---|---|
| 5,991,537 A * | 11/1999 | McKeon et al. | ............... | 717/115 |
| 6,826,716 B2 * | 11/2004 | Mason | ........................... | 717/131 |
| 7,299,382 B2 * | 11/2007 | Jorapur | ......................... | 717/124 |
| 7,392,509 B2 * | 6/2008 | Sinha et al. | ..................... | 717/126 |
| 7,437,718 B2 * | 10/2008 | Fournet et al. | ................. | 717/133 |
| 7,536,679 B1 * | 5/2009 | O'Connell et al. | ........... | 717/131 |
| 7,549,144 B2 * | 6/2009 | Jubran | ........................... | 717/131 |
| 7,603,660 B2 * | 10/2009 | Davia et al. | .................... | 717/133 |
| 7,685,576 B2 * | 3/2010 | Hartmann et al. | ............ | 717/132 |
| 7,823,125 B2 * | 10/2010 | Batabyal | ........................ | 717/120 |
| 7,844,951 B2 * | 11/2010 | Chen et al. | ...................... | 717/131 |
| 7,908,019 B2 * | 3/2011 | Ebrom et al. | ..................... | 700/11 |
| 7,926,025 B2 * | 4/2011 | Campbell et al. | ............. | 717/132 |
| 7,971,193 B2 * | 6/2011 | Li et al. | ........................... | 717/133 |
| 7,992,133 B1 * | 8/2011 | Theroux et al. | ................ | 717/133 |
| 7,996,815 B2 * | 8/2011 | Godwin et al. | ................ | 717/124 |
| 8,001,532 B1 * | 8/2011 | Jakubiak et al. | .............. | 717/125 |
| 8,181,172 B2 * | 5/2012 | Pohlan | .......................... | 717/168 |
| 8,276,122 B2 * | 9/2012 | Allen et al. | ..................... | 717/124 |

(Continued)

OTHER PUBLICATIONS

Xie(, Zhao, "A Framework and Tool Supports for Generating Test Inputs of AspectJ Programs"; 2006 ACM; [retrieved on Nov. 23, 2014]; Retrieved from Internet <URL http://dl.acm.org/ft_gateway.cfm?id=1119655.1119681>;pp. 190-201.*

(Continued)

*Primary Examiner* — Xi D Chen
(74) *Attorney, Agent, or Firm* — Brake Hughes Bellermann LLP

(57) ABSTRACT

In an aspect, the present application relates to a computer-implemented method, computer system, and computer program product for (automatically) generating reusable test components to test software applications. The computer-implemented method for generating reusable test components to test software applications may comprise: accessing an object model relating to at least part of a software application; and generating at least one test component applicable to test the software application, comprising: analyzing the object model, generating a meta-description from the object model and store the meta information in at least one descriptor according to a meta model, and generating the test component and a corresponding component implementation based on the descriptor.

17 Claims, 18 Drawing Sheets

(56) References Cited

U.S. PATENT DOCUMENTS

| | | | |
|---|---|---|---|
| 8,352,907 B2* | 1/2013 | Kettley et al. | 717/132 |
| 8,434,068 B2* | 4/2013 | Wrighton et al. | 717/131 |
| 8,479,165 B1* | 7/2013 | Kawashima et al. | 717/132 |
| 8,707,268 B2* | 4/2014 | Kawashima et al. | 717/132 |
| 8,813,039 B2* | 8/2014 | Maczuba | 717/133 |
| 2003/0093717 A1 | 5/2003 | Mason | |
| 2003/0135843 A1* | 7/2003 | Sluiman et al. | 717/124 |
| 2004/0010735 A1* | 1/2004 | Paternostro et al. | 714/38 |
| 2005/0210439 A1* | 9/2005 | Dimpsey et al. | 717/100 |
| 2007/0180093 A1* | 8/2007 | Roth et al. | 709/223 |
| 2007/0240127 A1 | 10/2007 | Roques | |

OTHER PUBLICATIONS

Tonella, "Evolutionary Testing of Classes", 2004 ACM; [retrieved on Nov. 23, 2014]; Retrieved from Internet <URL http://dl.acm.org/ft_gateway.cfm?id=1007512.1075528>;pp. 119-201.*

Li, "A Framework of Model-Driven Web Applicaiton Testing", 2008 IEEE; [retrieved on Nov. 23, 2014]; Retrieved from Internet <URL http://ieeexplore.ieee.org/stamp/stamp.jsp?tp=&arnumber=4020161>;pp. 1-6.*

Andrade, Machado, "Generating Test Cases for Real-Time Systems Based on Symbolic Models"; [retrieved on Nov. 23, 2014]; Retrieved from Internet <URL http://ieeexplore.ieee.org/stamp/stamp.jsp?tp=&arnumber=6475130>;pp. 1216-1229.*

Extended EP Search Report for EP Application No. 10290256.6, mailed Nov. 15, 2010, 12 pages.

Fix, G., "The Design of an Automated Unit Test Code Generation System", Sixth International Conference on Information Technology: New Generations, Apr. 27-29, 2009, pp. 743-747.

Communication Pursuant to Rule 69 EPC for EP Application No. 10290256.6, mailed Nov. 21, 2011, 2 pages.

Notification of European Publication Number and Information on the Application of Article 67(3) EPC for EP Application No. 10290256.6, mailed Oct. 19, 2011, 2 pages.

Response to Extended European Search Report for EP Application No. 10290256.6, filed on Mar. 24, 2011, 19 pages.

European Office Action for EP Application No. 10 290 256.6 dated Feb. 19, 2014, 10 pages.

"Facade pattern—Wikipedia, the free encyclopedia", Apr. 15, 2010, Retrieved from the Internet: URL:http://en.wikipedia.org/w/index.php?title=Facade_pattern&oldid=356235556, retrieved on Feb. 12, 2014, 5 pages.

Response to the Communication of Feb. 19, 2014 for EP Application No. 10 290 2356.6-1225, filed Apr. 7, 2014, 18 pages.

* cited by examiner

Figure 1C void TextField.SetText(string value);

string TextField.GetText(void);

```
' TAO Component: GuiVComponent - SetText
ImportType "GuiVComponent"

'Begin Parameters
Uri=GetParameterValue("Uri")
TheValue=ResolveParameter("TheValue")
'End Parameters GuiVComponent_SetText Uri, TheValue
```
— 221

```
' TAO Component: GuiTableControl_SetCellData
ImportType "GuiTableControl"

'Begin Parameters
Uri=GetParameterValue("Uri")
Row=GetParameterValue("Row")
Column=GetParameterValue("Column")
TheValue=ResolveParameter("TheValue")
'End Parameters GuiTableControl_SetCellData Uri, Row, Column, TheValue
```
— 223

```
' Component Implementation: GuiTableControl - SetCellData
Function GuiTableControl_SetCellData( Uri, Row, Column, TheValue )
 On Error Resume Next
 EventComponentBegin()
 GuiTableControl_SetCellData = GuiTableControl_SetCellData_Impl ( Uri, Row, Column, TheValue )
 EventComponentEnd()
End Function Function GuiTableControl_SetCellData_Impl( Uri, Row, Column, TheValue )
 Set GS_guiControl = GuiScripting().FindGuiControlByUri(Uri)

Set GS_aChildObject = GS_guiControl.GetCell( ToInt(Row), ToInt(Column))
 GS_aChildObject.Text = TheValue
 ReportLog "INFO", "GuiTableControl_SetCellData", "Target: "+GetLabel(GS_guiControl)+" - Value: " + TheValue
End Function
```
226

```
' Component Implementation: GuiVComponent - SetText
Function GuiVComponent_SetText( Uri, TheValue )
 On Error Resume Next
 EventComponentBegin()
 GuiVComponent_SetText = GuiVComponent_SetText_Impl( Uri, TheValue )
 EventComponentEnd()
End Function Function GuiVComponent_SetText_Impl ( Uri, TheValue )
 Set GS_guiControl = GuiScripting().FindGuiControlByUri(Uri)
 GS_guiControl.Text = TheValue
 ReportLog "INFO", "GuiVComponent_SetText", "Target: "+GetLabel(GS_guiControl)+" - Value: " + TheValue
End Function
```
225

Figure 2E

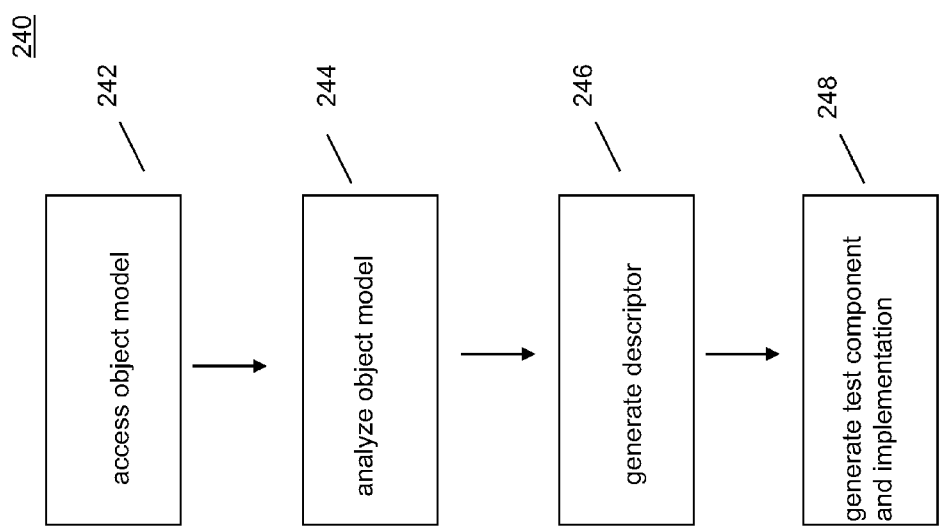

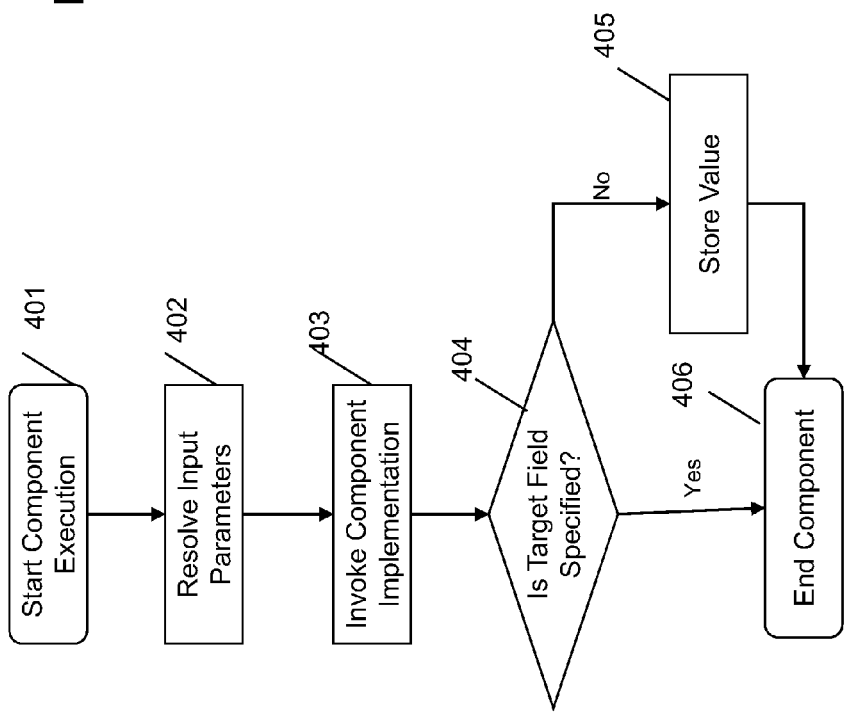

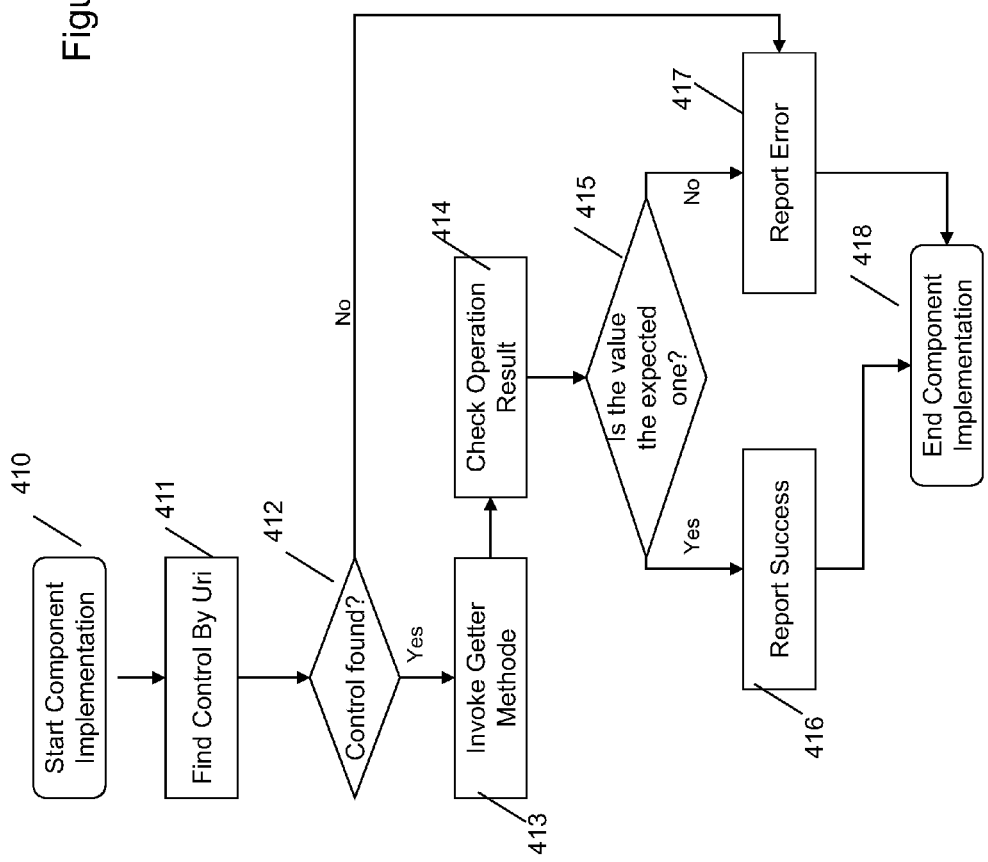

GENERATING REUSABLE TEST COMPONENTS OUT OF REMOTE APPLICATION PROGRAMMING INTERFACE

CROSS-REFERENCE TO RELATED APPLICATION

This application claims priority under 35 U.S.C. §119 to European Patent Application EP10290256.6, filed May 14, 2010, titled "SYSTEMS, METHODS AND COMPUTER PROGRAM PRODUCTS FOR GENERATING REUSABLE TEST COMPONENTS OUT OF REMOTE APPLICATION PROGRAMMING INTERFACE," which is incorporated herein by reference in its entirety.

TECHNICAL FIELD

The description is directed generally to test automation for testing software applications, and, in particular, to a computer-implemented method, computer system, and computer program product for (automatically) generating reusable test components to test software applications.

BACKGROUND

Test automation may use software programs to control execution of tests of software applications and/or software products. Test automation tools may support automated tasks such as product installation, test data creation, UI interaction, problem detection (such as parsing, polling agents, etc.), defect logging, comparison of actual outcomes to predicted outcomes, setting up of test pre-conditions, and/or other test control and/or test reporting functions.

Test automation may involve automating a (partly) manual process. Although manual tests may find some deficits in a software application, it is a laborious and time consuming process. Testing large software applications would hardly be possible to be tested manually in a reliable manner.

In particular, testing software applications manually may be an expensive and time consuming process, which in the end may cover only some aspects of test scenarios for a software application or product to be tested. Test automation may relate in principle to a process aiming at reducing the testing effort by using software to generate, maintain and/or run automated test scenarios (or tests). For this purpose, test automation tools may commonly provide features to record a test scenario for a software application, store the recorded events and replay them back. Such an approach may be applied to applications including a graphical user interface. However, a plurality of technical constraints may limit the reliability of the generated tests which may be very sensitive to changes performed on software applications to be tested. Changes may comprise for example, changing the location of the control in its parent container, renaming its text or its label, and/or changing the user language.

In other words, test automation tools may also record native events raised by the operating system (OS) while using the graphical user interface (GUI) of a software application. Hence, software applications may be tested via their GUIs. This approach is widely adapted by automated testing tools. A drawback of this approach may be that the generated tests may not only be sensitive to the underlying UI technology, but also to user preferences and/or OS-specific settings.

Furthermore, test maintenance may require deep technical knowledge to adapt to software changes. In some situations a scenario for testing purpose (e.g. test cases/test scenarios) needs to be recorded again. Test Frameworks may partly solve test maintenance issues due to the concept of test composition. Using test frameworks, the test cases may be created by aggregating test components. Test components may refer to reusable blocks representing an atomic operation of a software application to be tested. The testing software application may in this case be operable to simply adapt the parameters of each component occurrence without any deep technical knowledge.

An alternative to the above described approach may be based on bypassing the GUI layer of the software application to be tested and to directly test the application via its remote application programming interface (API).

In order to use this approach and still benefit from the ability to use test composition (i.e. composing test components according to a test scenario) a test framework may need to deliver a component per method exposed by the API. Even though most of the components are similar, creating those components manually may be a very tedious task, especially when several implementations are necessary depending on the targeted test framework and/or the underlying scripting language.

Using the second approach, another problem may occur. A testing software application (or tester) using a test framework may create tests/test scenarios by aggregating test components, wherein each test component may expect some input parameters. The test framework (comprising test automation) may only provide input parameters using simple types (e.g. integer, real, long, string, etc.). As a consequence, a method expecting a complex object (e.g. a list, an array, etc.) as input parameter cannot be used by the tester. Therefore, test automation using the second approach and thereby merely generating a wrapper on top of the target object may not solve the problem with regard to the input parameters.

Hence, there is a need to provide a computer-implemented method, a system and a computer program product referring to a test automation tool which reduces an implementation and maintenance effort of automatically testing software applications independent from any input parameters. Furthermore, the testing software application should be able to test a business logic according to an object model underlying a software application and/or a software product without any deep technical knowledge and to maintain previously recorded tests and hence without losing the benefit of test composition.

SUMMARY

According to one general aspect, a computer-implemented method for generating reusable test components to test software applications is provided. The method may comprise accessing an object mode relating to at least part of a software application; generating at least one test component applicable to test the software application, comprising: analyzing the object model, generating a meta-description from the object model and store the meta information in at least one descriptor according to a meta model, and generating the test component and a corresponding component implementation based on the descriptor.

Typically, an object model may describe a software program or application through a possibly hierarchical structure of public interfaces of the software program or application. Hence, an object model may describe interfaces to a software program which can be used from outside (possibly remote) programs and/or applications.

A software application is automatically tested directly via its remote API to thereby benefit from the ability to use test composition. Test components are automatically generated from extracted meta-descriptions from the interfaces exposed in the object model of the software application. In this way, implementation and maintenance effort of test automation is reduced.

In one implementation, the meta-description is extracted from the object model using reflection. For example introspection capabilities of the underlying API exposed by the software application being tested are used to retrieve the list of objects, methods and properties exposed by the application interfaces. This meta-information (in particular, public method signatures and/or public properties, wherein a property can be considered as two regular methods, one for getting the property value and one for setting the property value) is stored in descriptors that can be refined to better match test automation needs. Test components are then generated from the descriptors, wherein the generated component consists of: The component itself. This is the entity used by testing software to build test scenarios. This entity is a facade to the underlying component implementation. The component implementation stored in a shared library.

According to another aspect, the object model is exposed through a remote application programming interface (API) of the software application.

According to yet another aspect, analyzing the object model may rely on introspection of the object model to retrieve one or more method signatures, and/or one or more properties specifying objects of the software application.

According to yet another aspect, the descriptor comprising the meta-description to properly generate the test components may provide a name for the test component; a location of the test components in a file manager used when executing a test scenario for the software application; and/or a method signature of an object targeted by the test component.

According to yet another aspect, generating the meta-description may further comprise refining the meta-description, wherein the descriptor may further provide a method signature of a method to find a child object of the object targeted by the test component.

According to yet another aspect, generating the test component based on the descriptor may comprise determining whether a signature of a method of an object targeted by the test component returns a value or not; specifying one or more input parameters for the test component, wherein the input parameters correspond to expected input parameters of the method of the targeted object; and generating a URI for the test component, wherein the URI can be used to identify the targeted object.

According to yet another aspect, generating the test component based on the descriptor may further comprise combining a method signature of a method to find a child object of the object targeted by the test component with the signature of the method of the targeted object in the test component.

For example, a test automation tool integrated in a test framework may create test scenarios by aggregating test components. Each of the test component expect some specific input parameters.

In one implementation, the test framework itself may only provide input parameters using simple types (integer, long, string). As a consequence a method expecting a complex object (such as a list, an array e.g. for cells in a data table) as input parameter may not be directly used by a testing software. However, merely generating a wrapper on top of an object (comprising a method which expects complex input parameters) targeted by a test component may not be sufficient.

According to the above described aspects, a component implementation (similar to a wrapper) and additionally a corresponding test component which can then be used by the testing software may be generated.

The generated test components may expect more parameters than the targeted method because they need at least an additional parameter which is used to identify the targeted object, i.e. the URI (Uniform Resource Identifier). This URI may be required to identify an object targeted by the test component, because assuming that the instance of the targeted object can be created using the e.g. the Java "new" operator may not be true when testing software applications via their remote API. When testing the software application via its remote API, getting object instances (i.e. targeted objects in test components) may require to use a factory which is responsible for providing a reference to the remote object.

The test component and the corresponding component implementation may not be generated directly out of the meta model. Rather refinements according to the meta-model of retrieved meta-descriptions may be supported to better match testing needs by combining one or more method signatures and hence several atomic operations into a single test component.

The generated test components and corresponding component implementations may differ depending on the "nature" of the method of the targeted object and can directly be used by testing tools without any additional efforts. The generated code for the test components and corresponding component implementations may include an implementation logic responsible for sending the result to the test framework. The testing tool may never see or change the code. Furthermore, the testing tool may only have to provide the input parameters and the expected output parameters.

According to yet another aspect, the test component may define a facade to the corresponding component implementation, wherein the component implementation is stored in at least one shared library.

According to yet another aspect, the method may further comprise generating a test scenario for the software application by composing generated test components.

In another general aspect there is provided a computer-program product comprising computer readable instructions, which when loaded and run in a computer system and/or computer network system, cause the computer system and/or the computer network system to perform a method as described.

In yet another general aspect there is provided a computer system for generating reusable test components to test software applications. The system may comprise a test automation tool with a generator, the generator being operable to: access an object model exposed through a remote application programming interface (API) of a software application; generate at least one test component applicable to test the software application, comprising: analyze the object model, generate a meta-description from the object model and store the meta information in at least one descriptor according to a meta model, and generate the test component and a corresponding component implementation based on the descriptor; and the test automation tool being operable to: generate a test scenario for the software application by composing generated test components.

According to yet another aspect, the system and/or the generator may be operable to perform any one of the describe methods.

The subject matter described in this specification can be implemented as a method or as a system or using computer program products, tangibly embodied in information carriers, such as a CD-ROM, a DVD-ROM, a semiconductor memory, signal and/or data stream, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various MRI machines.

Details of one or more implementations are set forth in the accompanying exemplary drawings and exemplary description below. Other features will be apparent from the description and drawings, and from the claims.

BRIEF DESCRIPTION OF THE DRAWINGS

FIGS. 1A to 1C show an exemplary object model and an exemplary (possibly targeted) object of a software application to be tested.

FIGS. 2A to 2G show exemplary test component generation and generation of corresponding component implementations using a generator of the test automation tool.

FIGS. 4A and 4B show exemplary methods implementing test component and component implementation generation in the test automation tool for get methods.

DETAILED DESCRIPTION

Technical Terms

Figure 1A:
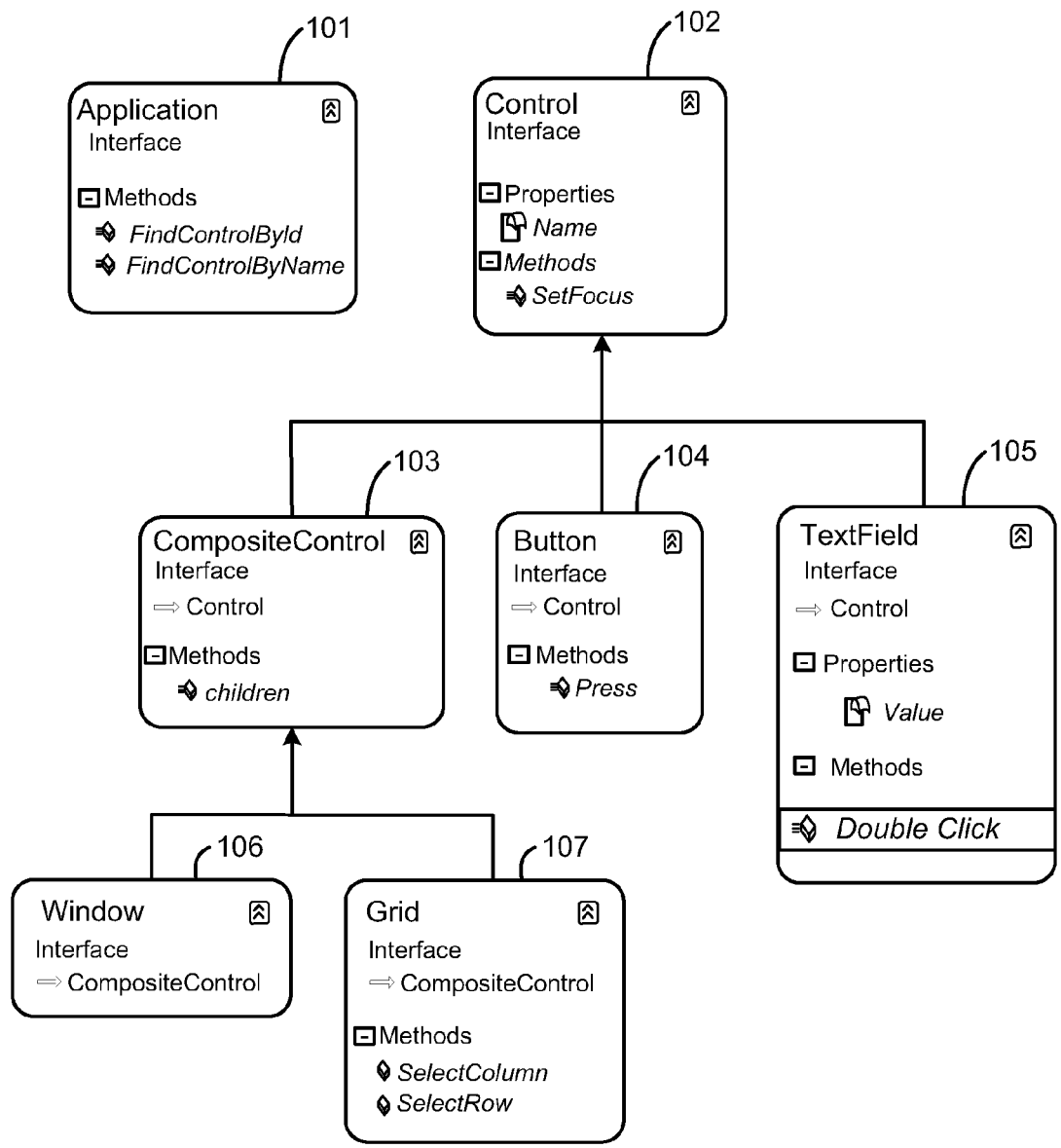

Following technical terms are widely used throughout the description. The terms may refer to but are not limited to the subsequently given explanations.

Test—A test may relate to an entity persisting in a (possibly web-based) test management tool such as HP Quality Center. Tests generated by a test automation tool may be composite objects comprising a set of one or more components, a list of one or more input parameters, and/or a data table (e.g. an MSExcel sheet) providing the input parameter values.

(Test) Component—A test component or component may relate to an entity persisting in a (possibly web-based) test management tool such as HP Quality Center. A test automation tool may deliver a set of default components that may be intended to be exported and/or uploaded to a repository of the test management tool (e.g. a HP Quality Center repository). A component may comprise script coding responsible for calling a relevant corresponding component implementation from a runtime library of the test automation tool.

Consolidated Component (Test Composition)—A consolidated component may relate to a concept providing the ability to merge one or more or all test components used by a test in a single component. Consolidation may aim at improving reusability of test scenarios so that a consolidated component may be reused in another test scenario with different parameters and/or at improving performance of test execution by getting rid of an overhead of an initialization.

Test Automation—In general, test automation may relate to a process aiming at reducing a testing effort by using software to generate, maintain, and/or run automated tests. Test automation tools may focus on application scenarios to generate tests and test components. Test automation may refer to use of software to control execution of tests, comparison of actual outcomes to predicted outcomes, setting up of preconditions, and other test control and test reporting functions. Test automation may involve automating a (partly) manual process. Although manual tests may find some deficits in a software application, it is a laborious and time consuming process. Testing large software applications would hardly be possible to be tested in a reliable manner. In addition, manual testing of software applications may not be effective in finding certain classes of defects. Test automation may relate to a software program which automatically performs testing of software applications. Once tests have been automated, they may be run quickly. Hence, test automation may be a very effective way for extensively testing software products and/or applications that have a long maintenance life, because even minor errors over the lifetime of the application may be detected which could otherwise cause features to break which were previously working at an earlier point in time.

Test Management—Test management may relate to managing tests. In general, test management tools may rely on test components and may use test composition to create test scenarios (or tests). A test management tool may relate to a software which can be used to manage (automatic) tests of software applications that have been previously specified. Test management tools often may include requirements and/or specifications management modules that may allow to automatically generate a requirement test matrix which relates to a metric operable to know functional coverage of systems/applications/products under test. In other words, test management tools may check how many requirements and/or specifications are covered by available tests. An example of a test management tool is HP Quality Center comprising software (HP QuickTest Professional) which provides test automation for software applications, products, systems, and/or environments.

Meta-Programming (including meta-description and meta-information)—Meta-programming may relate to writing of computer programs that write or manipulate other programs (and/or themselves) as their data, or performing at least a part of the work at compile time that would otherwise be done at runtime. A language in which a meta-program is written may be referred to as a meta-language. A language of a program being manipulated may be referred to as an object-language. The ability of a programming language to be its own meta-language may be referred to as reflection or reflexivity. Meta-programming may work at least in two different ways. A first way may refer to expose internals of the runtime engine to the programming code through application programming interfaces (APIs). A second way may refer to dynamic execution of string expressions that include programming commands. Hence, using meta-programming, computer programs may be able to write computer programs.

Reflection—In computer science and in particular in programming, reflection relates to a process by which a computer program can observe and/or modify its own structure and/or behavior. The programming paradigm driven by reflection may be called reflective programming. Reflective programming may be considered as a particular kind of meta-programming. Basically, in several computer architectures, program instructions are stored as data so that a differentiation between instructions and data may depend on how they are treated by the underlying programming language in a computer. In some programming languages, instructions are executed and data is processed. In some other programming languages, programs may treat instructions as data and therefore make reflective modifications. Reflection may be applied for observing and/or modifying program execution at runtime. For example, a reflection-oriented program component may monitor the execution of an enclosure of code of a program and may modify itself according to a desired goal related to that enclosure. This may be accomplished by dynamically assigning program code at runtime. Hence, reflective programming may introduce the concept of meta-description which may keep knowledge of a program structure of a program and/or a compound statement of the program. Meta-description may store information such as names of methods, a name of a class, a name of one or more parent classes, and/or what the program and/or compound statement is supposed to do. Using said stored meta-description when an object is consumed (processed), the meta-description may be reflected upon to find out operations (or methods) that the information supports. An operation that issues in the required state via the desired state transition may be chosen at runtime without hard-coding it.

Introspection—Introspection may relate to a concept similar to reflection. Since reflection may involve some limitations which may rely on an aspect that a reflection API may be primarily designed to examine programs loaded for execution, whereas other aspects may be charged with inspecting a program that is not about to be executed. Introspection may therefore provide improved analysis features wherein for example metadata describing a program may be divided into a hierarchy of primitives referred to as nodes. A node may represent a class in the introspection API that can be used to access relevant metadata attributes. An example of introspection is the introspection code model for the .Net Framework for examining assembly metadata in the System.Reflection namespace of the .NET Assembly.

In the following, a detailed description of examples will be given with reference to the drawings. It should be understood that various modifications to the examples may be made. In particular, elements of one example may be combined and used in other examples to form new examples.

In general, the present application relates to methods, systems and computer program products referring to a test automation tool which reduces implementation and maintenance effort of test automation. The test automation tool may be integrated and/or incorporated in a test management tool such as HP Quality Center, Test Workbench of SAP Solution Manager, IBM Rational Quality Manager. The methods, systems and computer program products (automatically) generate reusable test components out of the (remote) application programming interface (API) of the software application, product, system, and/or environment to be tested.

The test automation tool directly tests a software application via the remote application programming interface (API) of the software application instead of using the graphical user interface (GUI) of the software application. The test automation tool relies on a meta-description of the API of the software application being tested and automatically generates one or more test components by analyzing the meta-description. The one or more test components can be composed to at least one consolidated component according to a test scenario (also referred to as a test) for the software application.

Basically, the test automation tool provides a solution to the above captioned approach by using reflection, wherein generation of one or more test components for a software application to be tested using the test automation tool basically relies on introspection capabilities to retrieve one or more objects, methods, and/or properties which are exposed through the application programming interface (API) of the software application. The API may specify an object model underlying the software application. The exposed object model interfaces public properties and/or methods of objects of the software application. A public interface to a method is also referred to as a method signature (comprising a specification of required input parameters and return type and/or types of a method). The information retrieved during introspection (e.g. the one or more objects, the methods, and/or the properties of the inspected software application) is referred to as meta-description and is stored in one or more descriptors. The descriptors may be refined in order to better match test automation needs of the test automation tool.

The test automation tool further comprises a generator operable to (automatically) generate one or more test components for testing purposes of the software application. The generated test components may be reusable in that the test component may be used in different test scenarios without requiring deep technical knowledge and without changing any coding for the test component. The generator may operate on the meta-description retrieved during introspection. Hence, in order to reduce the effort of providing (reusable) test components the generator basically generates the test components based on one or more method signatures exposed through the API in the object model of the software application to be tested. To discover the method signatures, reflection and/or introspection capabilities of the software application being tested are used.

The generated test components may comprise the component itself, i.e. the entity used by the test automation tool to build or construct one or more test scenarios (or tests) for the software application to be tested and may represent a facade to the underlying implementation of the test components. The implementation of the test components also referred to as component implementations hereinafter are stored in one or more shared libraries. In software engineering a facade may relate to a design pattern wherein a facade may refer to an object that provides a simplified interface to a larger body of program code such as a class library.

In principal, the test automation tool may be used to test any software application provided with an API if the API provides a factory to retrieve references to one or more targeted objects of the software application. In software engineering a factory may relate to a design pattern wherein a factory may refer to an object operable to create objects. The factory may refer to one or more objects responsible for creating instances of objects (or proxies to remote objects).

In one exemplary implementation of the test automation tool, the test automation tool may be implemented as a SAP TAO implementation focusing on SAP GUI applications for which test automation is performed. The test automation tool may also be foreseen to test at least a sub-set of Web technologies (e.g. SAP BSP (Business Server Pages) and/or SAP Web DynPro).

In a further exemplary implementation of the test automation tool, the test automation tool may be integrated with a (web-based) test management tool (e.g. HP Quality Center) comprising software functional and regression test automation for software applications and environments (e.g. HP QuickTest Professional). Using such an implementation of the test automation tool, the test components generated by the generator may be specific to the HP Quality Center repository. Furthermore, the generated code for the generated test components may be then written in VB (Visual Basic) Script and interpreted using the HP QuickTest Professional automation tools.

With reference to the figures, an exemplary implementation and working of the test automation tool is described. The exemplary implementation is based on exemplary test scenarios for testing a SAP GUI application and in particular, for testing a Table Control entity of the SAP GUI application. It should be clear from the previous description of the test automation tool that any software application could be automatically tested in a similar manner as far as the API of such a software application provides a factory to retrieve references to one or more targeted objects of the software application.

Figure 1B:
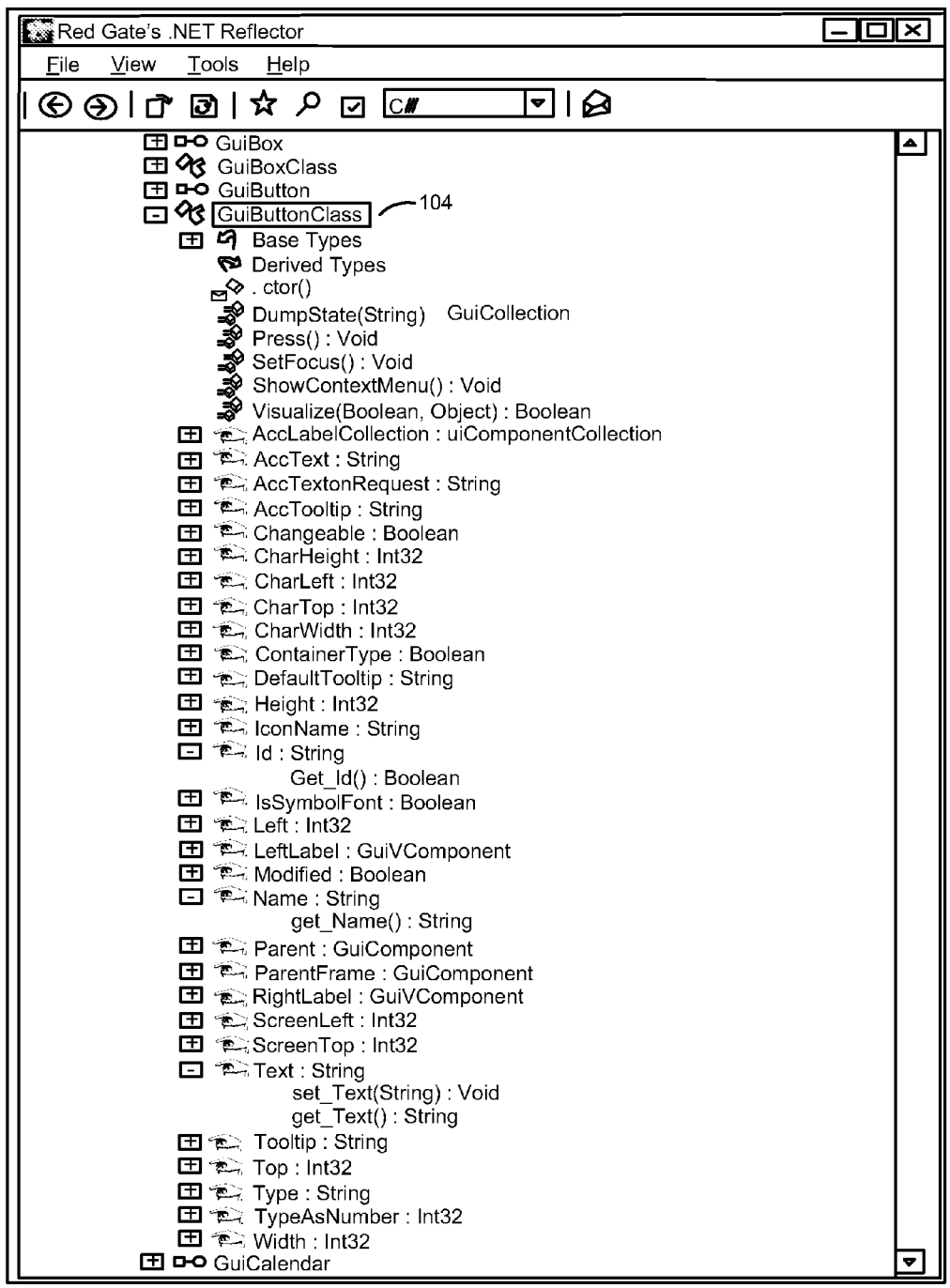
Figure 1C:
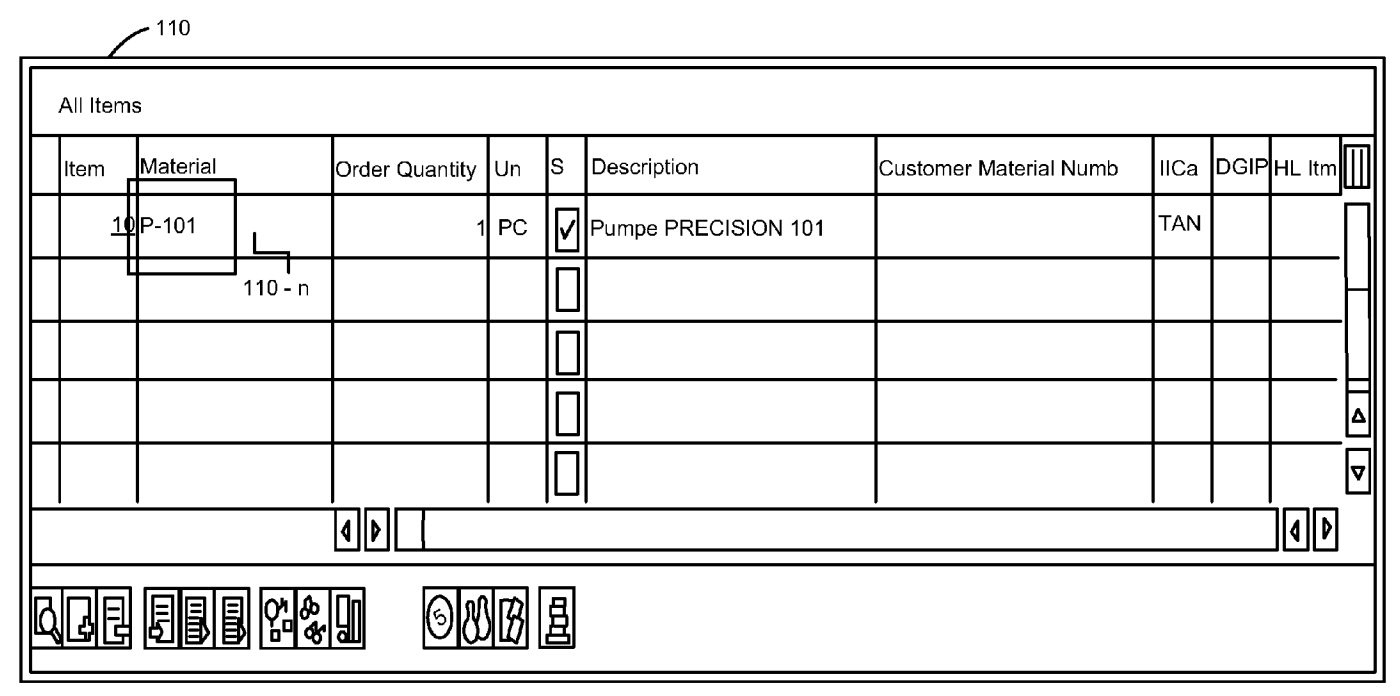

With reference to FIGS. 1A to 1C test automation on top of an exemplary object model 100 exposed by the API of an exemplary software application which can be tested by a test automation tool is shown.

According to the test automation tool, test automation relies on testing an object model 100 of a software application and not on the UI (user interface) rendering of the software application. Furthermore, the test automation tool is operable to check and/or test the object model 100 without any graphical user interface (GUI). In one exemplary implementation, the test automation tool is operable to remotely test the software application by sending a HTTP request directly to the software application and/or by invoking a Web service.

Software applications are often built on top of an object-oriented data model (referred to herein as an object model) and only the public part of the object model is exposed to external tools via an application programming interface (API) of the software application. That is the API exposes public interfaces comprising public methods and/or properties which interface one or more classes of objects being implemented in the underlying software application. For example, a public method may be interfaced by its method signature, i.e. expected input parameters and/or types and/or zero or more return types. For example, considering the MSWindows Operating Systems (OS) the API itself may represent a component object model (COM) interface providing access to remote objects. According to the test automation tool, test automation should benefit from said remote interfaces of the object model exposed through the API and not rely on GUI events and UI specific technologies.

FIG. 1A shows an exemplary object model 100 which can be used by the test automation tool to (automatically) generate test components and to composite or compose said test components for a test scenario. In one exemplary implementation, the object model 100 may be exposed by an SAP GuiScripting API of a SAP GUI application to be tested using the test automation tool. The SAP GuiScripting API may expose COM interfaces to control objects of the SAP GUI application. The exposed interfaces 101 to 107 of the object model 100 specify public methods and public properties that might be relevant for test automation in the test automation tool. The interfaces 101 to 107 provide signatures of the associated methods and properties without any implementation. The interfaces 101 to 107 are implemented by one or more classes in the software application (e.g. the SAP GUI application) which exposes the object model 100 through its API.

FIG. 1B refers to a screenshot of an object model 100 exposed by the corresponding API of a software application and shows exemplary properties and methods exposed by the GUI button interface 104 of the object model 100. As can be seen, the object model 100 of the software application may be very complex and a simple control object of an interface (e.g. interface 104) exposed through the API may expose a large number of methods and/or properties.

FIG. 1C is a screenshot of an exemplary object 110 of a class implemented in the software application (e.g. the SAP GUI application) which is exposed through the Composite-Control interface 103 of the object model 100. As can be seen, the object 110 refers to a table control object 110. The table control object 110 relates to a complex (composite) control object comprising one or more cells 110-$n$. Each of the one or more cells 110-$n$ can be identified by its row number and its corresponding column (or line) number.

A test automation tool responsible for testing such a table control object might need to assign values to corresponding cells 110-$n$ of the table control object 110. A test component operable to perform such an operation should be able to identify the targeted cell (e.g. cell 110-$n$), to identify a cell property of the cell 110-$n$ which can be changed, and to provide a new value for the cell property according to the change.

As exemplary shown, the software application to be tested exposes its object model 100 via its API. The test automation tool should be then able to test the business logic underlying the object model and thus the correctness of the software application without any deep technical knowledge of the software application and to also maintain previously recorded test scenarios (or tests). In one exemplary implementation, maintenance of tests is possible due to test composition.

The test automation tool uses reflection (and/or introspection) to analyze the object model 100 exposed by the API of the software application and determines which (parts) of the exposed public interfaces 101 to 107 might be relevant for test automation.

Basically, each object of the API exposes public methods and/or public properties through corresponding public interfaces 101 to 107. A property can be considered being composed of two regular methods. The two regular methods comprise a first method for getting a corresponding property value referred to as a get method and a second method for setting the corresponding property value referred to as a set method. Based on this observations, it becomes therefore possible to generate for a method exposed through the API in the public interface the corresponding test component. The generated test component might at least comprise input parameters that are matching the input parameters expected by the method.

In order to identify one or more targeted objects of the software application to be tested implementing corresponding interfaces 101 to 107 of the object-model 100 which might be relevant for test automation, a means to reference the object itself out of a test component is required. For example, in the object-oriented programming paradigm (e.g. used by Smalltalk, Java, C++) each method receives from an object an implicit additional parameter representing the object itself. For example, the "this" keyword is used by C# and Java languages to get the reference to the current object.

An equivalent of this implicit parameter (e.g. the "this" keyword) may also be necessary during test execution. Thus, at runtime (i.e. when executing a test scenario or test generated for a software application) the test must be able to provide information to identify the object targeted by the current test component.

In one exemplary implementation, a Uniform Resource Identifier (URI sometimes also referred to in the figures as Uri) providing all information required to look up for a remote targeted object of the software application (i.e. an object which is targeted by a test component) and made accessible by the software application through its API is used to identify the targeted object by a test component of a currently running test. A syntax for the URI itself may not be specified. Each software application being tested may use a different URI syntax depending on underlying technical constraints. However, the URI should be stable and may not rely on information that are subject to changes (like the one we already mentioned: location, label, etc.). Resolving an URI to find a targeted object during execution of a test may be performed by using shared libraries that are made available to all test components generated in the test automation tool for the software application being tested.

With reference to FIGS. 2A to 2G test component generation using a generator of the test automation tool is shown. The generator operates on an object model of a software application to be tested and exposed through the API of the software application e.g. on the object model 100 of FIG. 1A.

The generator (a component generator) of the test automation tool is operable to generate reusable test components for a software application to be tested. For this purpose, the generator analyzes the object model 100 of the software application. As previously explained with reference to FIGS. 1A to 1C, the object model 100 (comprising interfaces for the public objects and their related methods, and/or properties of the software application) is exposed through the API of the software application. Based on the analysis of the object model 100, the generator generates a meta-description of the public methods and/or the public properties of the interfaces 101 to 107 exposed through the object-model 100. The generator further provides means to refine the generated meta-description in order to better meet specific test automation requirements when testing the software application. Based on the generated meta-description of the object model 100, the generator (automatically) generates one or more test components and implementations of the test components. The implementations may depend on the nature of objects and related methods being tested. These aspects are explained in greater detail with reference to the figures.

The meta-description generated from the object model 100 refers to a list of the public methods and/or public properties exposed through the interfaces 101 to 107 for the software application. In one exemplary implementation, the meta-description is generated from the object model 100 using introspection. For example, when generating meta-description to the object-model of an SAP GUI application, the corresponding SAP GuiScripting API exposes the object model comprising the interfaces denoting the public methods and the public properties of the SAP GUI application, then the meta-description can be for example retrieved and generated by loading the .NET Assembly and using the .NET introspection capabilities.

The meta-description generated from the object model 100 is stored in one or more descriptors according to a meta model. The one or more descriptors provide for each method retrieved from the object model 100 a corresponding method signature (i.e. expected input parameters and/or types and/or a return type for the method).

In principle, a coding for a test component necessary to perform a method (as exposed through an object model) is in several cases (substantially) the same. However, the coding differs depending on a method and corresponding operations to be performed and a number of input parameters and/or a return type. A tool generating the test components uses (substantially) the same programming logic and adapts the generated code according to a signature of a method selected from an exposed object model. The tool might be a generator implemented with the test automation tool.

The generator takes as input parameter a descriptor providing the list of components that are to be generated. As previously explained, the descriptor comprises meta-description retrieved from the object model during introspection and/or reflection. The descriptor basically provides the information required to properly generate one or more test components out of an object model exposed through the API of the software application to be tested. For example, the descriptor may provide the following meta-description to the generator for generation of a test component: a name for the test component (because the corresponding default name might be confusing), a location of the test component (where to put it in a hierarchy of a file manager managing generated test components), the method signature of the method targeted by the test component (for simple use-cases this might be sufficient; however, further information could be required), and/or the method signature of the method which can be used to find a child of the class being addressed through the test component (e.g. in the exemplary object model 100 shown in FIG. 1A this might become necessary when the targeted control object e.g. exposed through the CompositeControl interface 103) is a container having at least one child control object).

Figure 2A:
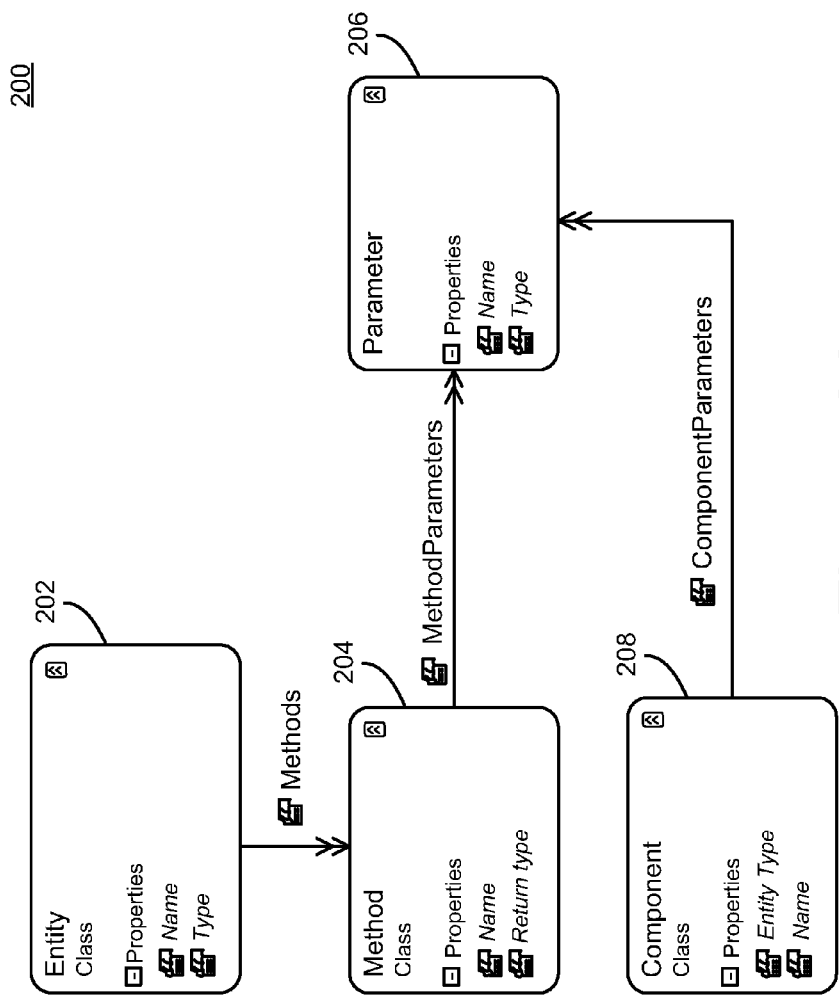

FIG. 2A shows an exemplary meta model 200 comprising persisted information according to the object model 100. As previously explained, the meta model 200 basically stores meta-description retrieved from the object model 100 in descriptors. The meta model 200 comprises one or more classes 202 to 208. The Entity class 202 represents one or more entities which are exposed by the object model 100. An entity object comprises a list of one or more methods (of type Method class 204). The Method class 204 represents one or more public methods exposed through the object model 100 (e.g. a set text method, a get text method, get cell method, etc.). A method object comprises one or more properties such as a name, a return type, and/or a list of parameters (of type Parameter class 206). In the meta model 200 used by the test automation tool, properties are considered as regular methods comprising a method for getting the corresponding property value (a get method) and one method for setting the value (a set method) unless, the property is read-only. The Parameter class 206 represents the method parameters (the parameters of method objects instantiated from the Method class 204). According to the meta model 200, a parameter object comprises one or more properties such as a name and a type. The Component class 208 represents (test) components generated by the generator. The Component class 208 can be used to refine the meta-description of the object model 100. Refinement of the meta-description is described in greater detail below.

As explained above, the meta-description stored in the descriptors according to the meta model 200 are generated from the exposed object model 100 by using introspection. Inspecting the object model 100 exposed through the API interfaces 101 to 107 of the software application may gather information which might be not relevant for test automation. For example, in one exemplary implementation where the test automation tool is part of a web-based test management tool such as the HP Quality Center, a method operating on complex types may not be directly converted to test components by the generator because the exemplary targeted test framework (i.e. the HP Quality Center) only supports simple types such as string, integer, long, double, boolean. Therefore, in this exemplary implementation, the generator excludes all methods that operate on complex types such as list, array, etc. (i.e. which use complex types in their signature and/or return type). In other words, for methods which operate on complex types no test components are generated in one exemplary implementation. The methods are taken from the object model 100 being exposed through the API of the software application.

FIG. 2B shows exemplary methods 210, 212 according to which test components are generated using the meta-model 200 and hence the meta-description derived from a public property exposed through the object model 100. In one exemplary implementation, the generator is operable to directly generate test components out of the corresponding method signature disposed in the meta-description in the meta-model 200.

The methods 210, 212 shown in FIG. 2B are retrieved from the TextField interface 105 of the object model 100 of FIG. 1A. In particular, the text property of a TextField object can be used in this example to retrieve two methods 210, 212, one 210 for getting the value of the text property and one 212 for setting the value of the text property. Using the meta-description retrieved from the object model 100 the properties can be considered as the shown methods 210 and 212.

The generator then generates two corresponding test components using the meta-description according to the methods 210 and 212:

A first test component TextField.GetText comprising the following parameters is generated from said meta-description (i.e. the signature of method 210): URI: a Uniform Resource Identifier of the targeted object (i.e. an object derived from the TextField interface), ExpectedValue: the expected value of the text property, and TargetField: the target where to store the retrieved value.

A second test component TextField.SetText comprising the following parameters is generated from said meta-description (i.e. the signature of method 212): URI: a Uniform Resource Identifier of the targeted object (i.e. an object derived from the TextField interface), and TheValue: the new value of the text property.

From a test perspective getting the value may only be reasonable if the test framework (e.g. HP a web-based test management tool such as Quality Center) within which the test automation tool is implemented can perform additional operations and check the consistency of an actual value. For example, the ExpectedValue parameter of the first test component can be used to check the retrieved value against an expected value and the TargetField parameter of the first test component can be used to be able to store this information and thus make said information available to a subsequent test component.

Figure 2C:
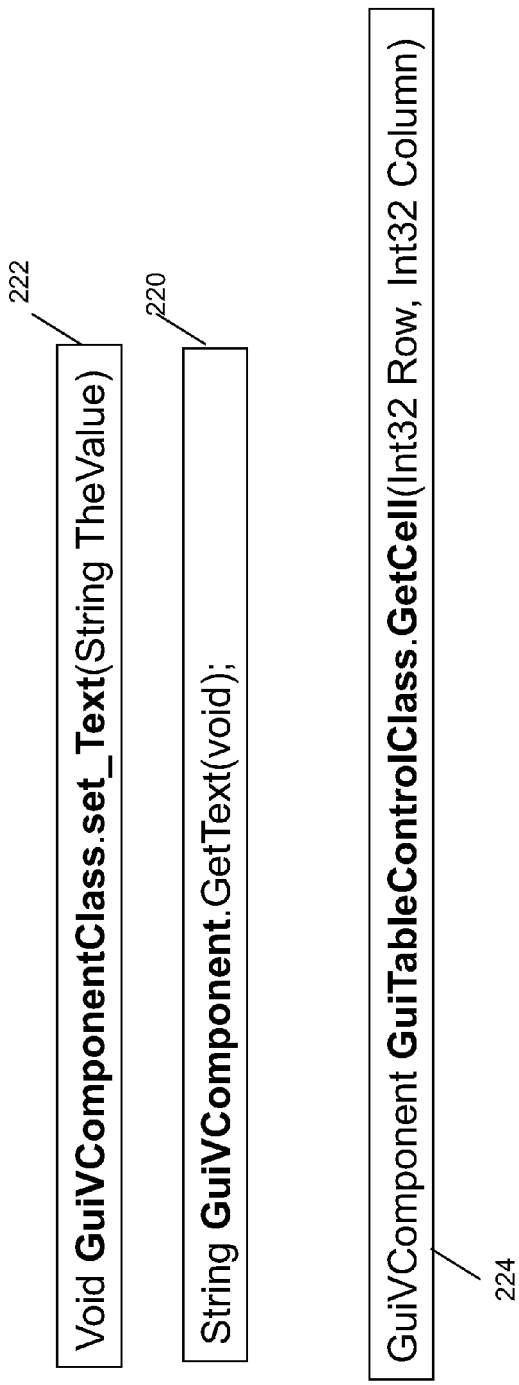

With reference to FIG. 2C an exemplary meta-description refinement using the meta model 200 comprising the meta-description derived from the object model 100 during introspection is shown.

As previously explained and based on the test framework within which the test automation tool and the corresponding generator are implemented, some publicly exposed methods from the object model 100 may not be directly executable by the test framework due to a specific parent child relationship defined in the object model. Therefore, a method signature comprising such complex relationships and/or interdependencies according to the inheritance hierarchy of the object model 100 may be excluded from test component generation. This solution might however not be in every case satisfactory since some of those methods might be relevant for test automation.

Referring back to the object model 100 some of the exposed public properties may be based on complex relationships (involving child objects according to the object model). For example, a TableControl object 110 as shown in FIG. 1C may comprise cells 110-$n$ that are identified by coordinates and represented in terms of columns and rows. Then with analysis of the object model 100, the meta-description exposes methods 220, 222, 224. Since the method 224 may not be directly used during testing, the generator may refine the meta-description by generating a single test component out of a combination with the method 224 with the set method 222 and/or with the get method 220.

Considering again the exemplary TableControl object 110 from a SAP GUI application, assigning a value to a cell 110-$n$ can be performed in two different ways.

In a first way the control in the table object 110 can be directly targeted within the cell 110-$n$, because a SAP GuiScripting control class extends the GuiVComponent class which exposes a text property providing access to the value (i.e. the text) of the control object. This can be achieved by using the set method 222.

A second way is to target the table control object itself and then to use the GetCell method 224 to get a reference to the child object within the cell 110-$n$. The operation is then performed against the child object.

From a testing tool perspective both approaches may be (substantially) similar. A difference is that corresponding generated test components comprise different input parameters (e.g. the methods 220 and 222 comprise simple input parameters whereas the method 224 comprises complex input parameters in terms of a relationship to a child object).

FIG. 2D shows exemplary test components 221 and 223 generated by the generator from the exposed method signatures 222 and 224 on testing assigning a value to a cell 110-$n$ of the exemplary TableControl object 110 in the above described two different ways.

According to the first way, a code generation logic for the set method 222 (and also for the get method 220) may comprise the following steps: The generator determines whether the method 222 or 220 returns a value or not. Based on this information it can generate a "get" or "set" test component. The generator generates a test component having a list of input parameters matching the ones of the method 222 or 220. An additional parameter (URI) is always added to identify the targeted object. The test component 221 generated according to this generation logic based on the set method 222 is shown in FIG. 2D.

According to the second way, generation of the test component 223 as shown in FIG. 2D differs from the first one. The meta-description for the method 224 is refined in this case. In particular, since it is require to target the table control object itself and then to use the GetCell method 224 to get a reference to the child object within the cell 110-$n$, the method that is to be used to find the corresponding child object is additionally specified in the meta-description. The generator is then able to combine the signatures of said two methods in a single test component 223. The generated test component can then use some of the parameters to find the child control and the remaining ones to perform the operation. Accordingly, the signatures of the set method 222 and the get cell method 224 are combined in the test component 223, wherein the URI refers to the Uniform Resource Identifier of the targeted GuiTableControl object, the Row refers to the line in the table, the Column refers to the column in the table, and the Value to the new value of the text property.

As explained with reference to FIG. 2A, the Component class 208 of the meta-model 200 for the meta-description derived by introspection from the object model 100 is the one allowing such specific refinement of the object model 100 such as combining of one or more methods to perform a single test operation using a single generated test component.

In one exemplary implementation of the test automation tool, the tool may not support combining more than two methods, since there might be no use cases where a combination of more than two methods would become necessary. However, the exemplary implementation of the descriptor syntax based on the meta-description according to the meta-model 200 may be flexible enough to combine a chain out of one or more methods and thus handle more complex use cases.

In one exemplary implementation of the test automation tool, the tool may additionally take care to convert an input value of a method exposed through an object model to the appropriate parameter type as declared by the corresponding method signature provided in the meta-description derived from the object model. For example, input parameters may be provided as string. For example, the string "true" can be converted to true (as Boolean) when the method expects a Boolean parameter. In one exemplary implementation it may be also possible to handle more complex type conversion.

In one exemplary implementation of the test automation tool, the tool is integrated into the HP Test Framework (i.e.: HP Quality Center+HP QuickTest Professional). In this implementation test components are generated in accordance with this test framework.

In another implementation, the test automation is integrated into another (we-based) test framework (e.g. a test management tool and test automation functionality) and creates test components in compliance with this test framework and also generate corresponding program code in a different programming language.

The generated test components such as test components 221 and 223 as previously described may only provide a facade to an underlying corresponding implementation of the test components 221 and 223.

FIG. 2E shows exemplary implementations of the test components 221 and 223 which are generated in the test automation tool. The component implementation 225 is generated for the test component 221 and the component implementation 226 is generated for the test component 223. The component implementations 225, 226 may not be part of the corresponding test component 221, 223 itself, but rather stored in a shared library provided with the test automation tool which can be accessed by the corresponding test component 221, 223 when executing a test scenario. Corresponding algorithms for generating the component implementations 225 and 226 are described below with reference to FIGS. 3B and 4B.

The component implementation 225 of the test component 221 comprises two functions, wherein the first function GuiVComponent_SetText is basically responsible for handling exceptions and/or errors. The second function GuiVComponent_SetText_Impl looks for objects targeted by the component and performs the corresponding operation.

The component implementation 226 of the test component 223 is similar to the one generated for a regular component (e.g. component 221 and corresponding implementation 225 which rely on simple input types). A difference relates to the additional retrieval of a child object which might be not accessible directly.

Figure 2F:
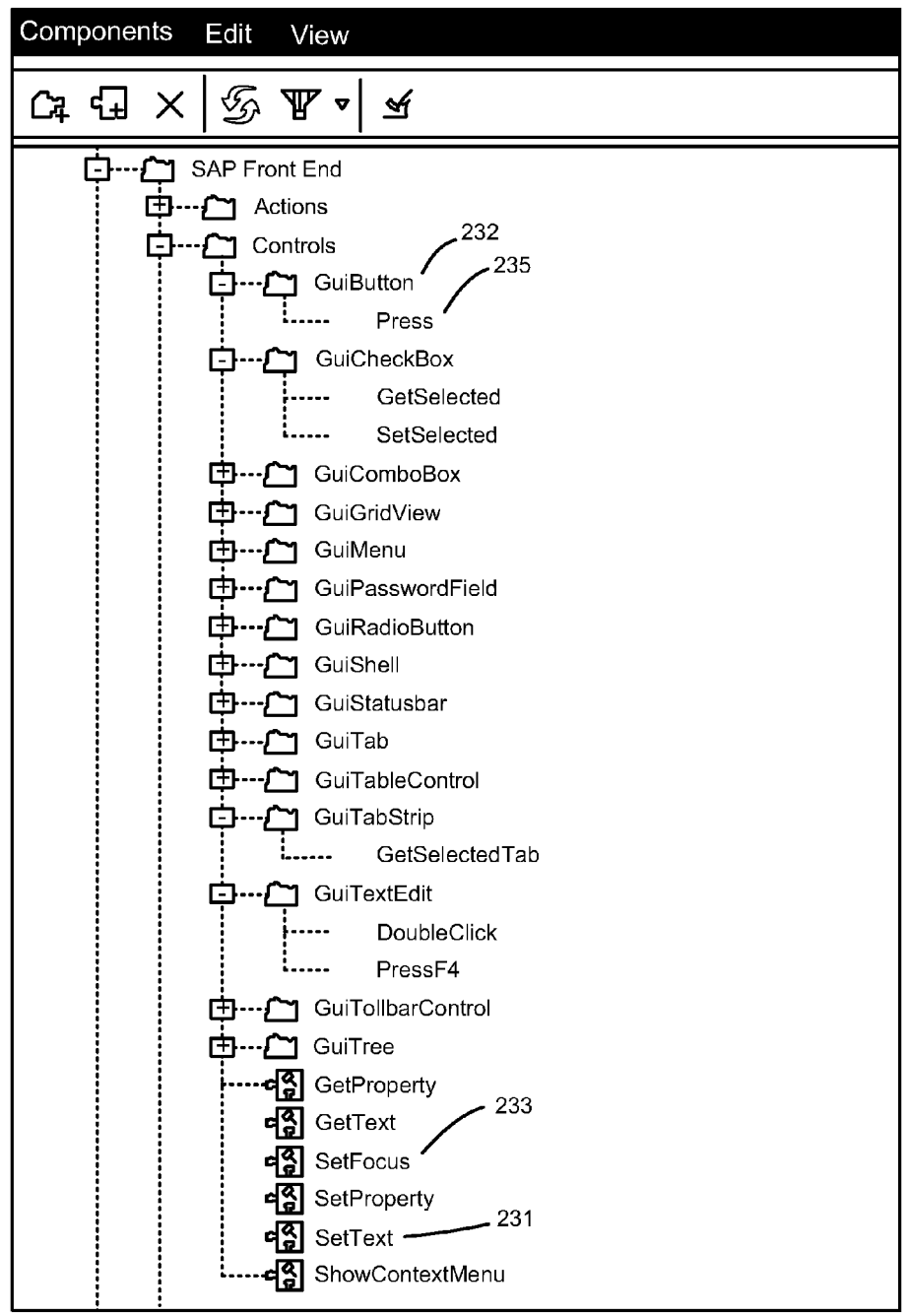

The screenshot 230 shown in FIG. 2F exemplifies a list of test components which are generated out of the object model 100 exposed through the API of the software application to be tested and through use of the meta-model 200 and the corresponding meta-description retrieved during introspection of the object model 100. As exemplary shown, the generated test components are ordered in a file manager such as the one shown in the screenshot 230.

Common methods and/or properties such as for example SetText 231, SetFocus 233, etc may be relevant for all objects of the software application. In one exemplary implementation according to an ordering of the file manager for the generated test components, the test components generated with regard to such common methods and/or properties may be put directly beneath a top level folder (e.g. the SAP Front End root folder in case an SAP GUI application is tested).

Test components which relate to rather control-specific objects according the object model a dedicated folder may be created according to the ordering in the file manager for the test components. For example the Press component 235 may only be relevant on objects of type: GuiButton 232 and is therefore ordered in a child folder of the GuiButton object 232 exposed through the Button interface 104.

A principle implementation of a computation logic to generate test components automatically out of an object model as described above with reference to the previous figures is shown in an exemplary flow diagram in FIG. 2G.

The method 240 for generating a test component starts with accessing an object model, 242 (e.g. the object model 100 of FIG. 1A). By using reflection and/or introspection a meta-description description is generated from the object model, 224. The meta description specify the signatures of public methods and/or properties exposed through the object model. The signature of a method may basically relate to its required input parameters and a possible return type. Properties, which may be considered as two methods, one for setting the property value and one for getting the property value, may also be described by the corresponding signatures of get and set methods for property values. The meta-description may be stored in at least one descriptor. At least one test component and corresponding component implementation is then generated from the descriptor, 248. The descriptor is taken as input parameter by a test component generator and provides a list of one or more test components to be generated. The descriptor provides the information required to generate test components and related component implementations (e.g. the information specified above).

The generated test component may relate to a set method or a get method. In the first case, no return type is required but in the second case, a return type is required since the get method returns a value, namely the retrieved value of the object. The test component generated comprises a list of input parameters corresponding to the input parameters according to which the test component is generated. Furthermore, a URI is added to the test component to identify the targeted object. In case the targeted object (i.e. the object to be tested by the test component) refers to a child object, such a reference is also specified in the descriptor. Hence, the descriptor (e.g. the one specified above on page 21) explicitly specifies the method to be used to find the child object. The signatures of the method for the targeted object and the signature for the method of the child object are then combined in a single test component.

Figure 3A:
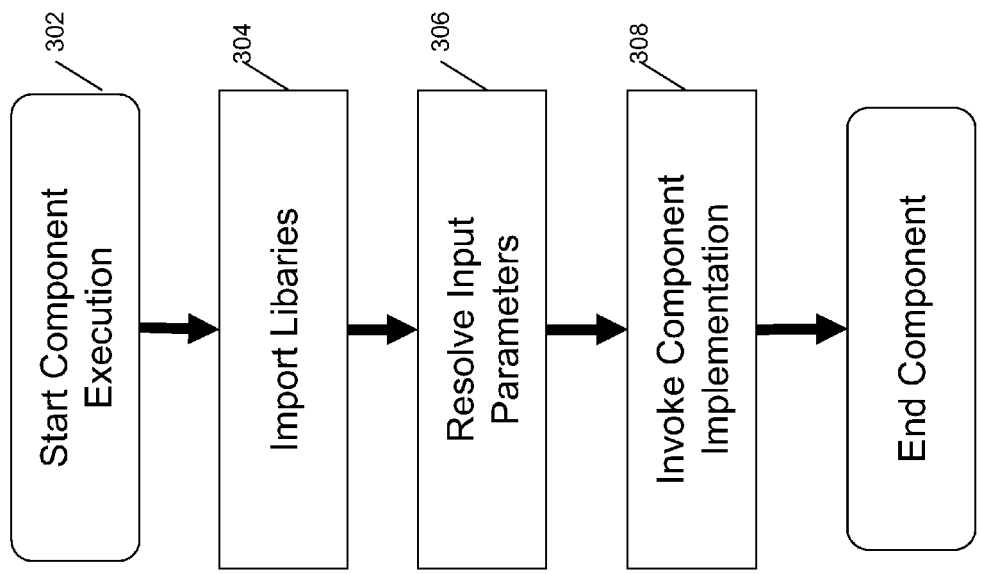
FIGS. 3A and 3B show exemplary methods implementing test component and component implementation generation in the test automation tool for invoke and/or set methods.
Figure 3B:
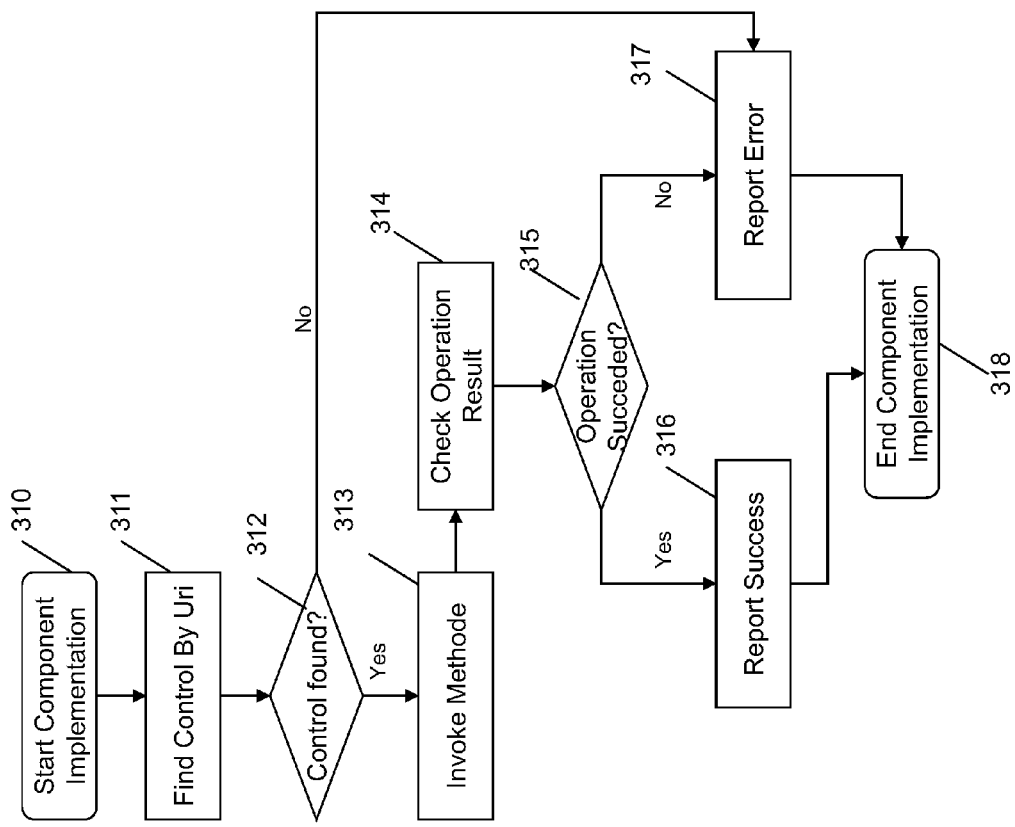

With reference to FIGS. 3A and 3B code generation and implementation of a test component relating to invoking a method and/or setting a property value is explained.

In an alternative and/or in an additional aspect test components generated as described with reference to FIGS. 1A to 2F may be tested in a testing environment at runtime.

In one aspect, a test scenario for a software application to be tested may be generated from one or more test components generated according to the above description with reference to FIGS. 1A to 2F. The test components of the test scenario may then be tested by executing the test scenario. For one or more of the test components a corresponding component implementation may be retrieved from a shared library, input parameters of the test component may be resolved with respect to a targeted object. Finally, the corresponding component implementation may be invoked to test the targeted object.

In yet another aspect, a test scenario for a software application to be tested may be generated from one or more test components generated according to the above description with reference to FIGS. 1A to 2F. The test components of the test scenario may then be tested by executing the test scenario. For one or more of the test components a corresponding component implementation may be retrieved from a shared library, input parameters of the test component may be resolved with respected to a targeted object. In case a target field in the targeted object is not specified the execution of the test component is finished. Otherwise, before finishing the test component execution, a value retrieved from the target field is stored.

FIG. 3A shows an exemplary method for execution of a test component relating to invoking a method and/or setting a property value. In one exemplary implementation, code generated for a test component relates to a facade to a corresponding implementation of the test component. At 302, execution of the test component is started which comprises a proper initialization of the test component. Then, at 304, corresponding one or more libraries for execution of the test component are imported. Subsequently, input parameters to the test component are resolved at 306 by getting corresponding values from an underlying test execution context. At 308, execution of the test component is delegated to a corresponding component implementation (e.g. in shared libraries as those shown in FIG. 5B). The test component is terminated when the execution is finished at 310.

FIG. 3B shows an exemplary method for a component implementation performed by the generator. Basically, generation of a component implementation for a test component relies on the URI of the corresponding test component. A URI enables to get a reference to a targeted object of the software application being tested and is used to invoke the corresponding method.

At 310 the method to start a component implementation is invoked. The URI of the corresponding test component is used to retrieve a reference the targeted object of the software application being tested, 311. It is checked at 312 whether the targeted object is found. If this is the case 313, the corresponding method is invoked. An operation result is checked, 314 in order to determine whether the operation failed or not, 315. A status of the operation is then sent back (e.g. to the test framework with the integrated test automation tool) either that the operation succeeded, 316 or that an error occurred, 317. Finally, the component implementation is terminated 318.

With reference to FIGS. 4A and 4B code generation and implementation of a test component relating to invoking getting a property value is described.

FIG. 4A shows an exemplary method to generate a test component relating to getting a property value. Such a test component targets a method which is supposed to return a value. In the context of test automation it makes sense to check whether the retrieved value is consistent. The component flow described here differs from the component flow shown in FIG. 3A by its handling of the operation result. The value returned by the component implementation is stored in order to make it available to subsequent test components.

At 401 execution of the test component is started which comprises a proper initialization of the test component. Then, at 402, input parameters to the test component are resolved by getting corresponding values from an underlying test execution context. At 403, execution of the test component is delegated to a corresponding component implementation (e.g. in shared libraries as those shown in FIG. 5B). At 404, it is checked whether a target field is specified. If this is the case, the corresponding value is stored with the test component, 405. The test component is terminated when the execution is finished at 406.

FIG. 4B shows an exemplary method for a component implementation performed by the generator. The method basically differs from the component implementation method for set components as shown with reference to FIG. 3B in that when the targeted method returns a value, the generated component implementation has the ability to compare this value with the expected one.

At 410 the method to start a component implementation is invoked. The URI of the corresponding test component is used to retrieve a reference to the targeted object of the software application being tested, 411. It is checked at 412 whether the targeted object is found. If this is the case 413, the corresponding get method is invoked. An operation result is checked, 414. Then the returned value is compared to the expected value, 415. A status of the operation is then sent back (e.g. to the test framework with the integrated test automation tool) either that the operation succeeded, 416 or that an error occurred, 417. Finally, the component implementation is terminated 418.

Figure 5A:
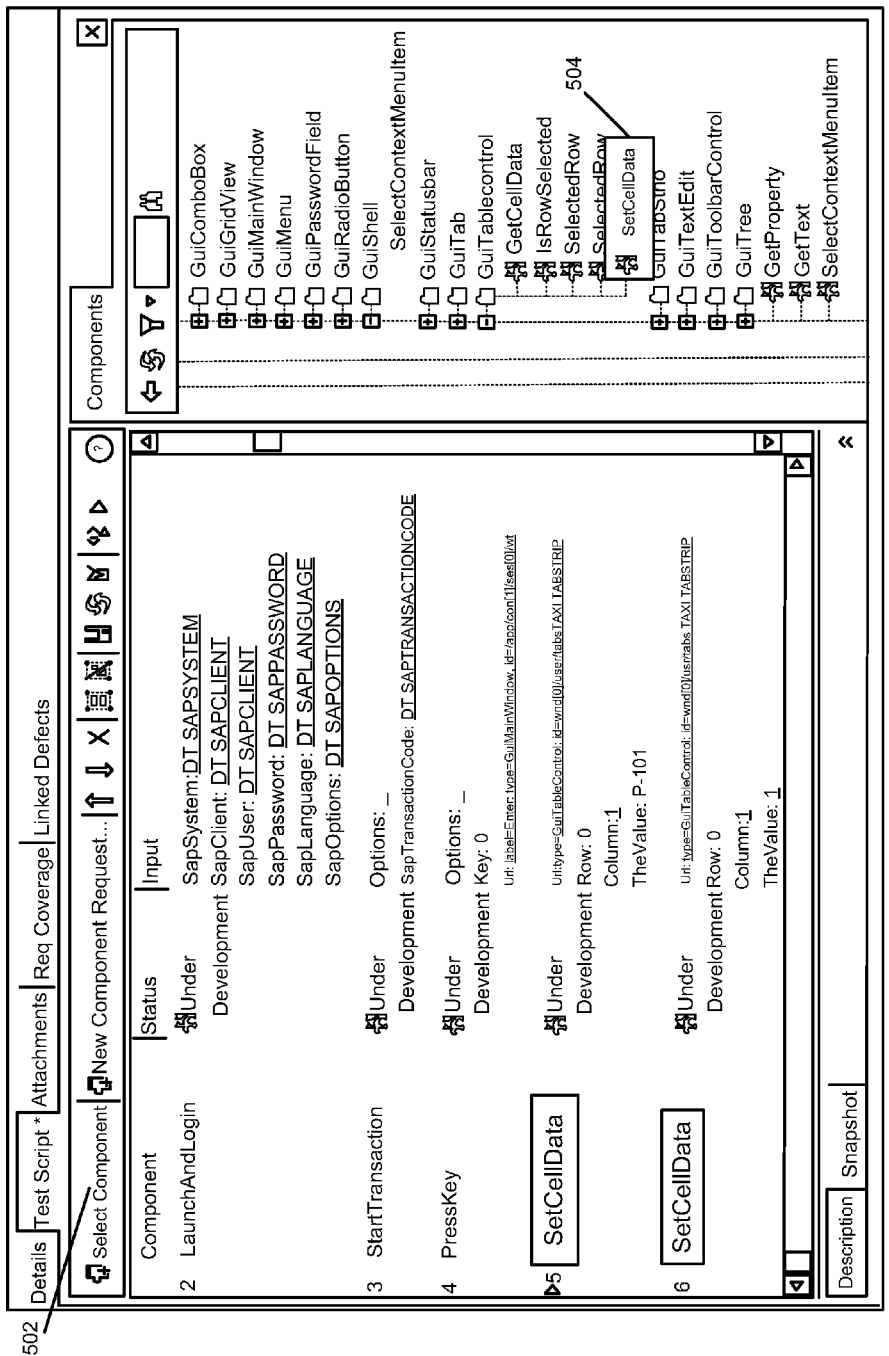
FIGS. 5A to 5C show exemplary test scenario composition and execution of the test scenario in a test framework incorporating the test automation tool.
Figure 5B:
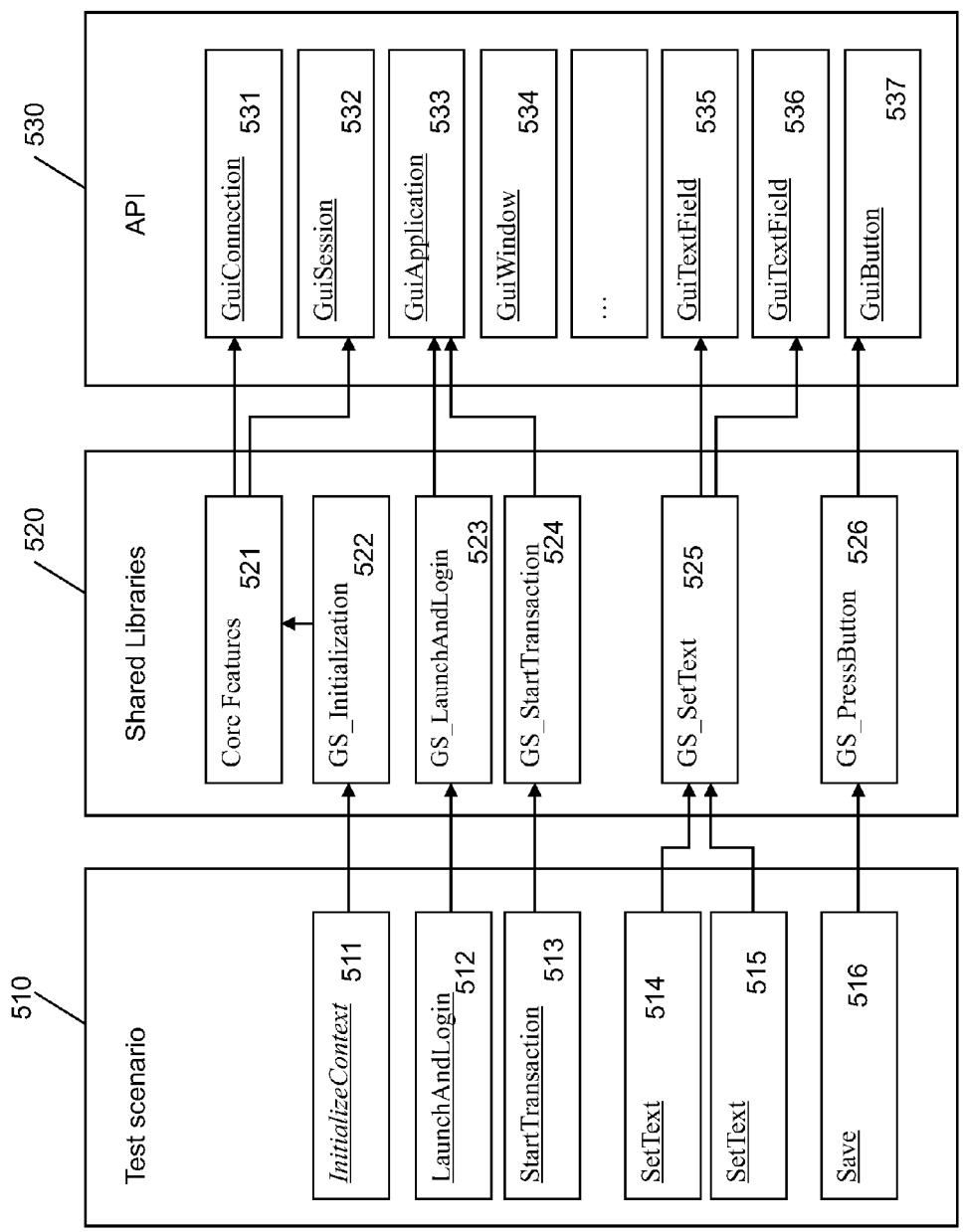
Figure 5C:
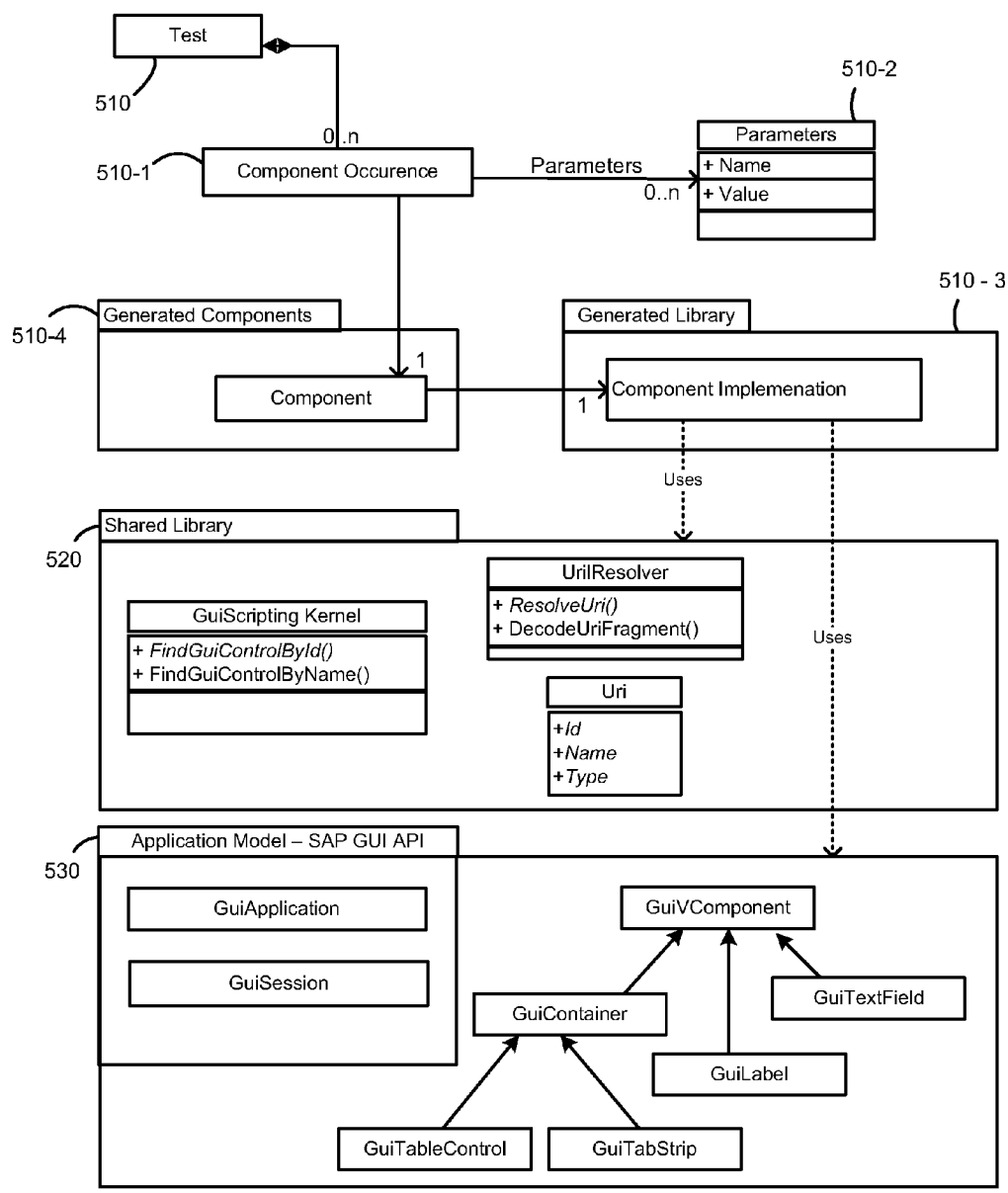

With reference to FIGS. 5A to 5C test execution based on the test components (e.g. those shown in FIG. 2E) which are generated from the object model 100 is shown.

FIG. 5A shows a screenshot of exemplary composition of test components in an exemplary implementation of the test automation tool in the HP test framework. Accordingly, the HP Quality Center provides an environment for creating test scenarios from one or more generated test components. The screenshot shows a component selection panel 502 within which one or more test components may be selected for a test scenario and the usage of the SetCellData component 504 within a test scenario.

FIG. 5B shows an exemplary test scenario to test the software application and layers 510, 520, 530 which could be involved when executing the test scenario. A test scenario 510 is composed of one or more test components 511 to 516 generated from the object model 100 of the software application being tested. When executing the test scenario, each test component 511 to 516 invokes its corresponding implementation 521 to 526 stored in one or more shared libraries 520 of the test automation tool. The corresponding implementations 521 to 526 comprise machine readable and executable code which is generated according to the signatures of the corresponding test components and stored in shared libraries 520. The shared libraries are accessible by each of the test components 511 to 516. For example, the InitializeContext test component 511 invokes, when being executed the GS_Initialization 522 and Core Features 521 component implementations. Similarly, the LaunchAndLogin test component 512 invokes its corresponding GS_LaunchAndLogin implementation 523. The StartTransaction test component 513 invokes its corresponding GS_StartTransaction implementation 524. The SetText test components 514 and 515 invoke their corresponding GS_SetText implementation 525. The Save test component 516 invokes its corresponding GS_PressButton implementation 526.

The implementations 521 to 526 of the test components 511 to 516 basically delegates to the corresponding remote objects of the software application being tested through the exposed object model 100 comprising interfaces 531 to 537 of the API of the software application being tested. The remote objects relate to implementations in the software application of the public interfaces 531 to 537. For example, the Core Features 521 component implementation delegates through the GuiConnection interface 531 and the GuiSession interface 532 exposed in the object model 100 of the software application tested by the exemplary test scenario 510 to the corresponding object implementation in the tested software application. Similarly, the GS_LaunchAndLogin implementation 523 and the GS_StartTransaction implementation 524 delegate through the GuiApplication interface 533 to the corresponding object implementation in the tested software application. The GS_SetText implementation 525 delegates through the GuiTextField interfaces 535 and 536 to the corresponding object implementation in the tested software application. The GS_PressButton implementation 526 delegates through the GuiButton interface 537 to the corresponding object implementation in the tested software application.

With reference to FIG. 5C main classes involved during test execution of a test scenario 510 from composition of the test scenario 510 from test components to the object model of the software application being tested and being used for test component generation.

FIG. 5C refers to an exemplary UML diagram showing entities which could be involved in the exemplary test scenario of FIG. 5B. A Test class 510 may represent a test scenario as stored in a test management tool such as HP Quality Center. A test scenario of the Test class 510 may comprise one or more component occurrences 510-1 which basically match components, e.g. components 511 to 516 as shown in FIG. 5B. Each component occurrence 510-1 comprises zero, one or more parameters 510-2 and comprises a references to its corresponding test component 510-3 and the corresponding component implementation 510-4. A component 510-2 may represent a test component and corresponding coding, e.g. 221 and 223 of FIG. 2D. A component implementation 510-4 may represent a component implementation of a test component such as 225 and 226 of FIG. 2E.

A shared library 520 may comprise generated component implementations and core features 521 which may be responsible for resolving an URI parameter of a test component and finding corresponding targeted objects in the software application to be tested.

The coding of component implementations may use the API 530 to perform the corresponding operations on the targeted objects. The application model 530 may be a different view of the object model 100 of FIG. 1A which the software application to be tested exposes.

Figure 6:
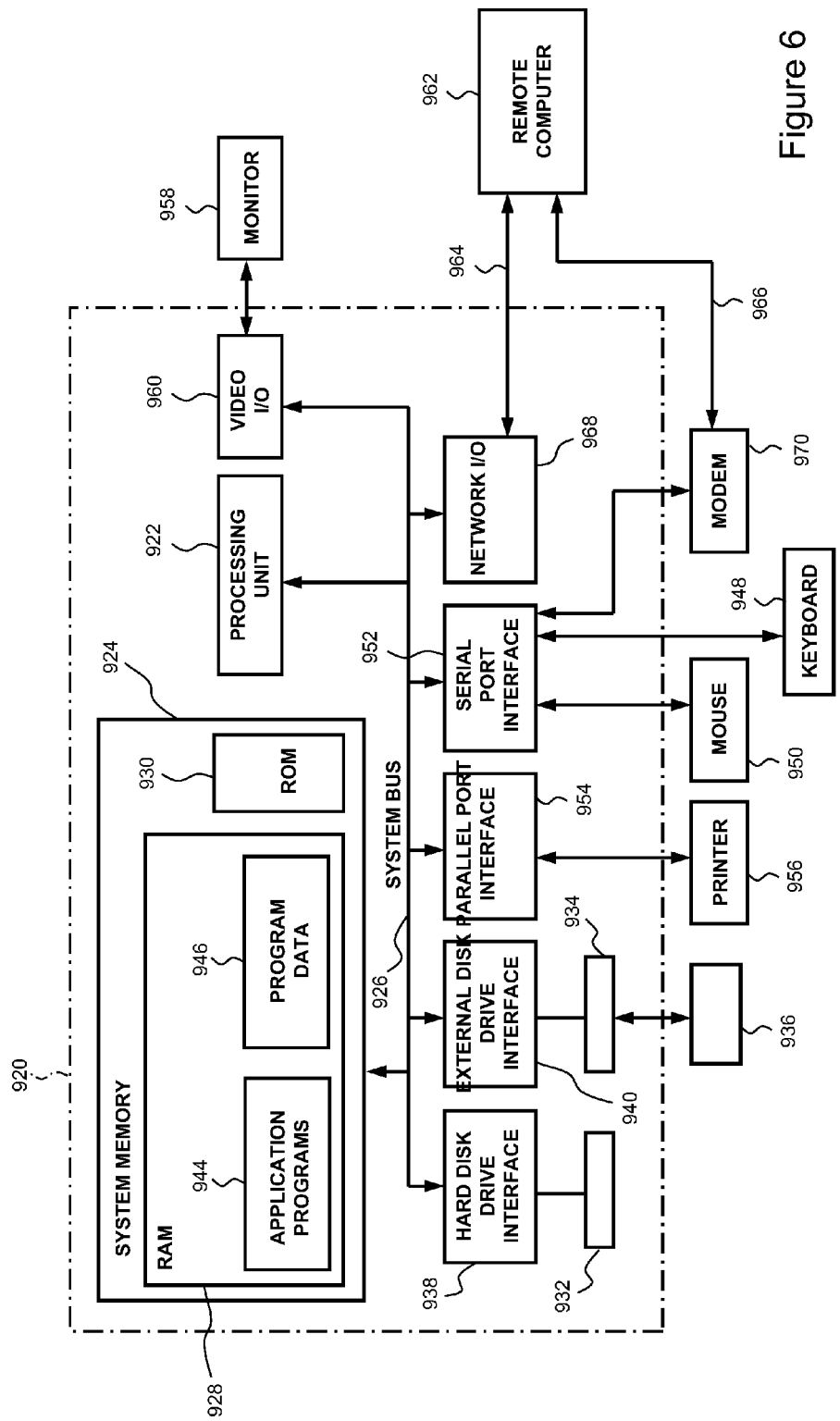
FIG. 6 shows an exemplary block diagram of a computer system and/or computer network system within which the test automation tool can be implemented-

FIG. 6 shows an exemplary system for implementing the invention including a general purpose computing device in the form of a conventional computing environment 920 (e.g. a personal computer). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide nonvolatile storage of computer readable instructions, data structures, program modules and other data for the personal computer 920. The data structures may include relevant data for the implementation of the method for generating reusable test components to test software applications, as described above. The relevant data may be organized in a database, for example a relational database management system or a object-oriented database management system.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1A to 5C.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956, and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 6 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 6 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 or other means for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore other data relevant to the method for generating reusable test components to test software applications (described above) may be resident on or accessible via the remote computer 962. It will be appreciated that the network connections shown are exemplary and other means of establishing a communications link between the electronic devices may be used.

The above-described computing system is only one example of the type of computing system that may be used to implement the method for generating reusable test components to test software applications.

What is claimed is:

1. A computer-implemented method for generating reusable test components to test software applications including executing instructions recorded on a non-transitory computer-readable storage media using at least one processor, the method comprising:

accessing an object model relating to at least part of a software application; and generating at least one test component applicable to test the software application, comprising:

analyzing the object model including retrieving at least two method signatures, generating a meta-description from the object model and storing the meta description in at least one descriptor according to a meta model, wherein the descriptor includes one or more input parameters, generating the test component and a corresponding component implementation based on the descriptor including combining two of the at least two method signatures in the test component, wherein:

the test component defines a facade to the corresponding component implementation and the test component uses one or more of the input parameters to find a child object of an object targeted by the test component, and the component implementation is stored in at least one shared library, and generating a test scenario for the software application by composing generated test components, wherein the test components are reusable for use in different test scenarios.

2. The computer-implemented method as in claim 1, wherein the object model is exposed through a remote application programming interface (API) of the software application.

3. The computer-implemented method as in claim 1, wherein analyzing the object model relies on introspection of the object model to retrieve one or more method signatures, and/or one or more properties specifying objects of the software application.

4. The computer-implemented method as in claim 1, wherein the descriptor comprising the meta-description to properly generate the test component provides:

a name for the test component;

a location of the test component in a file manager used when executing a test scenario for the software application; and a method signature of the object targeted by the test component.

5. The computer-implemented method as in claim 1, wherein generating the test component based on the descriptor comprises:

determining whether a signature of a method of the object targeted by the test component returns a value or not;

specifying one or more input parameters for the test component, wherein the input parameters correspond to expected input parameters of the method of the targeted object; and generating a uniform resource identifier (URI) for the test component, wherein the URI can be used to identify the targeted object.

6. The computer-implemented method as in claim 1, wherein the corresponding component implementation is accessible from the shared library by the test component when executing the test scenario.

7. A computer program product comprising computer-readable instructions tangibly embodied on a non-transitory storage media that, when executed, cause at least one processor to perform the actions of:

accessing an object model relating to at least part of a software application; and generating at least one test component applicable to test the software application, comprising:

analyzing the object model including retrieving at least two method signatures, generating a meta-description from the object model and storing the meta description in at least one descriptor according to a meta model, wherein the descriptor includes one or more input parameters, generating the test component and a corresponding component implementation based on the descriptor including combining two of the at least two method signatures in the test component, wherein:

the test component defines a facade to the corresponding component implementation and the test component uses one or more of the input parameters to find a child object of an object targeted by the test component, and the component implementation is stored in at least one shared library, and generating a test scenario for the software application by composing generated test components including user-selected test components from a user interface having a component selection area, wherein the test components are reusable for use in different test scenarios.

8. The computer program product of claim 7 wherein the object model is exposed through a remote application programming interface (API) of the software application.

9. The computer program product of claim 7 wherein analyzing the object model relies on introspection of the object model to retrieve one or more method signatures, and/or one or more properties specifying objects of the software application.

10. The computer program product of claim 7 wherein the descriptor comprising the meta-description to properly generate the test component provides:
- a name for the test component;
- a location of the test component in a file manager used when executing a test scenario for the software application; and
- a method signature of the object targeted by the test component.

11. The computer program product of claim 7 wherein the instructions that, when executed, cause at least one processor to perform the action of generating the test component based on the descriptor comprises instructions that, when executed, cause the at least one processor to perform the action of:
- determining whether a signature of a method of the object targeted by the test component returns a value or not;
- specifying one or more input parameters for the test component, wherein the input parameters correspond to expected input parameters of the method of the targeted object; and
- generating a uniform resource identifier (URI) for the test component, wherein the URI can be used to identify the targeted object.

12. The computer program product of claim 7 wherein the corresponding component implementation is accessible from the shared library by the test component when executing the test scenario.

13. A computer system for generating reusable test components to test software applications, the system comprising:
- a processor; and
- a test automation tool with a generator,
- the generator being operable to:
    - access an object model relating to at least a part of a software application; and
    - generate at least one test component applicable to test the software application by:
        - analyzing the object model including retrieving at least two method signatures,
        - generating a meta-description from the object model and storing the meta-description in at least one descriptor according to a meta model, wherein the descriptor includes one or more input parameters,
        - generating the test component and a corresponding component implementation based on the descriptor including combining two of the at least two method signatures in the test component, wherein:
            - the test component defines a facade to the corresponding component implementation and the test component uses one or more of the input parameters to find a child object of an object targeted by the test component, and
            - the component implementation is stored in at least one shared library, and
        - generating a test scenario for the software application by composing generated test components including user-selected test components from a user interface having a component selection area, wherein the test components are reusable for use in different test scenarios.

14. The computer system of claim 13, wherein the object model is exposed through a remote application programming interface (API) of the software application.

15. The computer system of claim 13, wherein the generator is further operable to:
- analyze the object model relying on introspection of the object model to retrieve one or more method signatures, and/or one or more properties specifying objects of the software application.

16. The computer system according of claim 13, wherein the descriptor comprising the meta-description to properly generate the test component provides:
- a name for the test component;
- a location of the test component in a file manager used when executing the test scenario for the software application; and
- a method signature of the object targeted by the test component.

17. The computer system of claim 13 wherein the corresponding component implementation is accessible from the shared library by the test component when executing the test scenario.

* * * * *